Patented Dec. 22, 1953

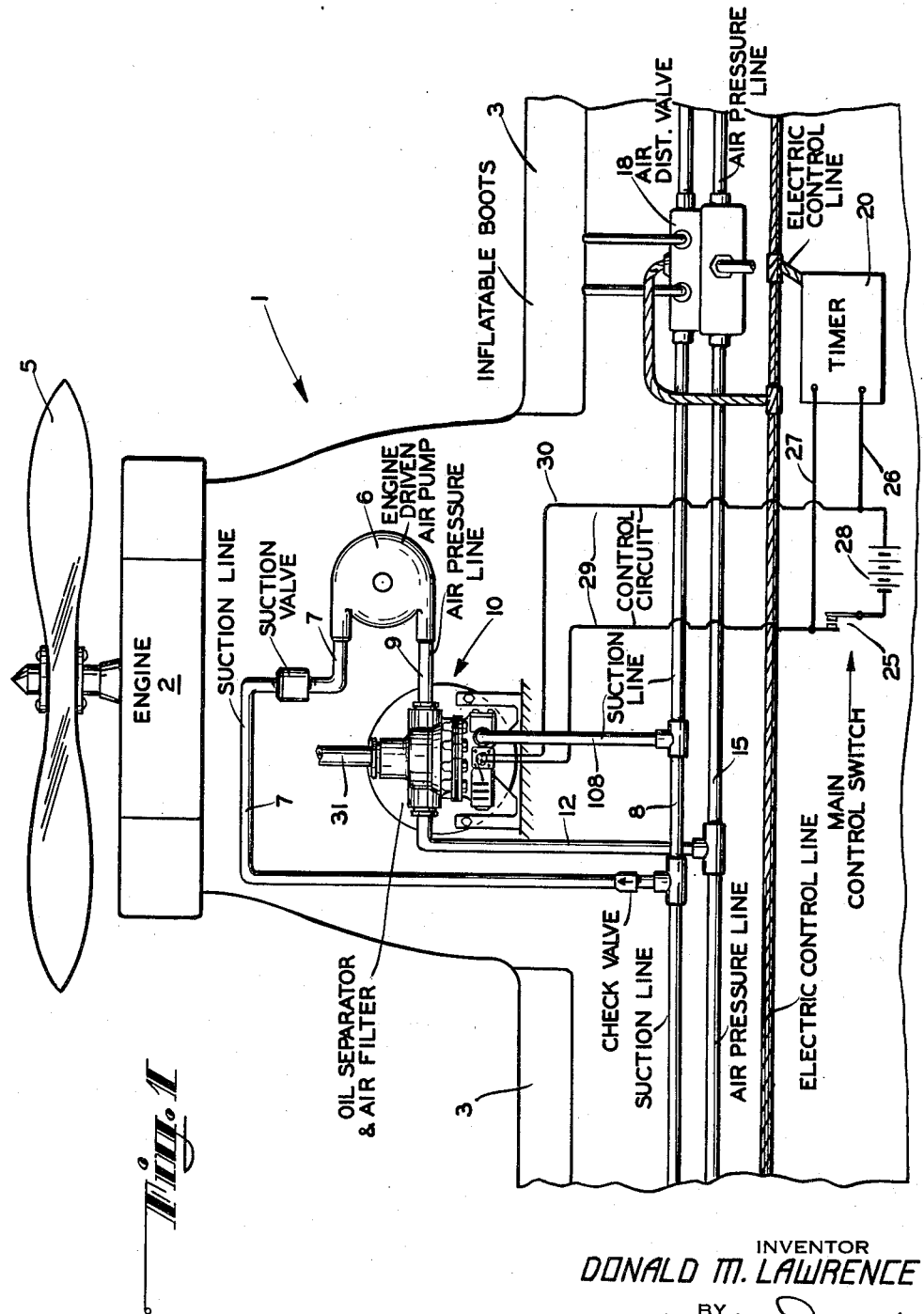

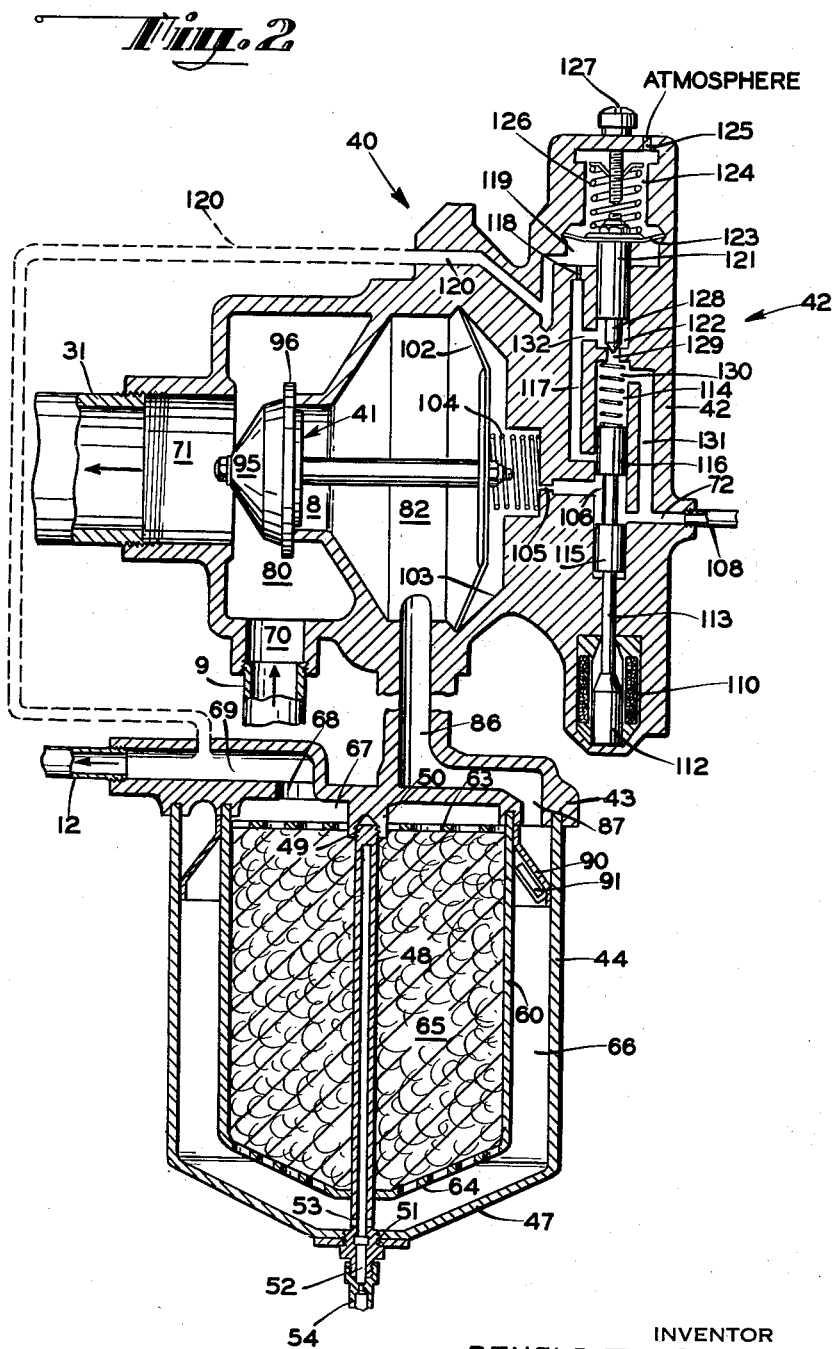

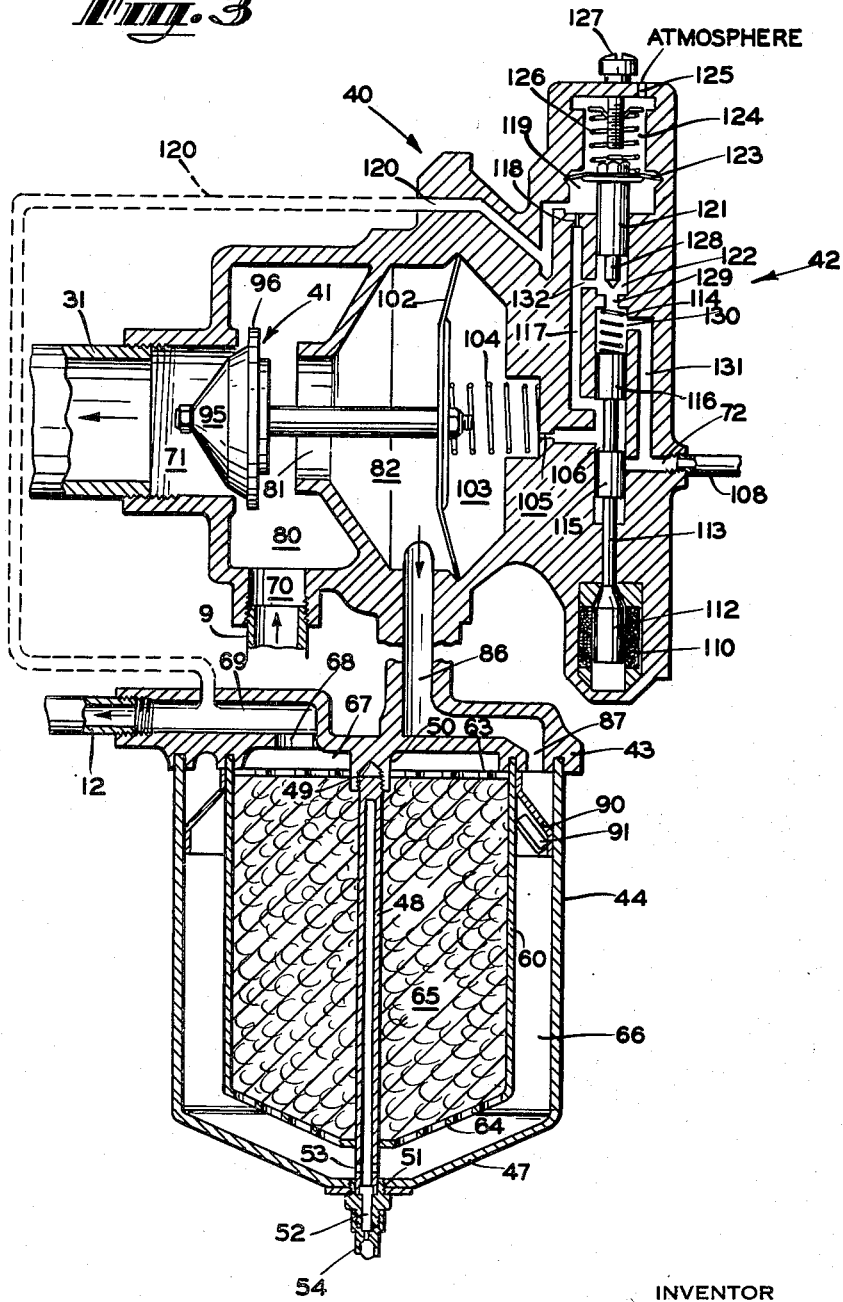

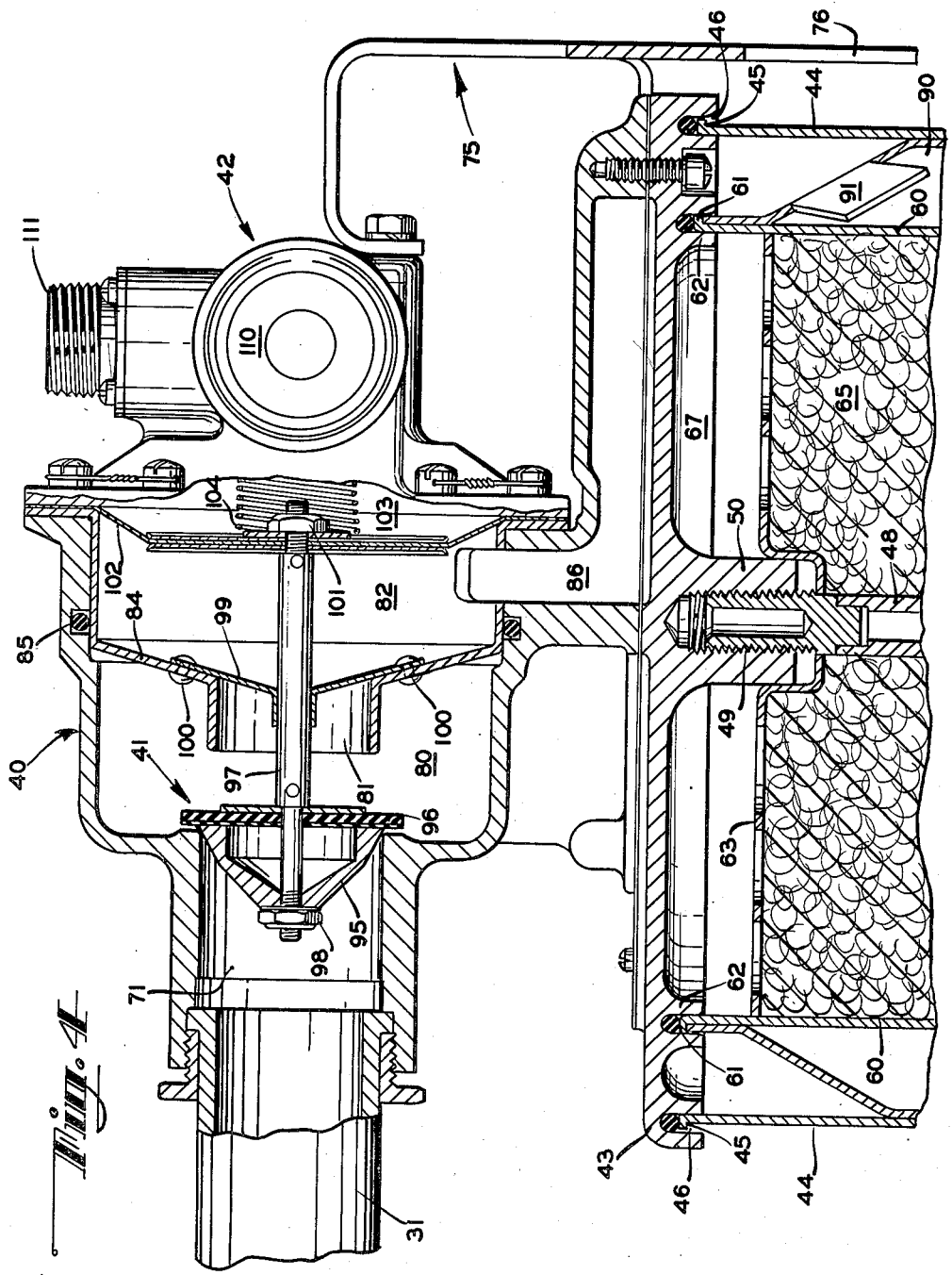

2,663,522

UNITED STATES PATENT OFFICE 2,663,522

OIL SEPARATOR AND PRESSURE REGULATING DEVICE FOR AIRCRAFT ICE ELIMINATING SYSTEMS

Donald M. Lawrence, Wood Ridge, N. J., assignor to Bendix Aviation Corporation, Teterboro, N. J., a corporation of Delaware Application March 11, 1947, Serial No. 733,960

14 Claims. (Cl. 244—134)

The present invention relates to inflatable ice eliminating systems for aircraft and to improvements in the mechanism described and claimed in my copending application Serial No. 585,941, filed March 31, 1945, now Patent No. 2,476,198. More particularly the present application relates to a novel operating system, oil separator and air filter for preventing oil, other liquids, and dirt from entering the inflatable elements of the system. Such elements are generally composed of rubber or like material and therefore will deteriorate if particles of oil are permitted to enter the elements with the inflating air supply from the air pump.

An object of the invention is to provide a novel electrically controlled oil separator and air filter device, particularly adapted for use with an electrically controlled system such as shown in the copending application Serial No. 498,249, filed August 11, 1943, by Donald M. Lawrence, David Gregg and Myron L. Taylor.

Another object of the invention is to provide a novel solenoid operated separator and filter device.

Another object of the invention is to provide a novel separator and filter device so arranged that the device may be placed in an operative condition, only at such times as the ice eliminating system is in an operating condition, so as to increase the life of the filter material and reduce the size of the device.

Another object of the invention is to provide in a compact assemblage a novel oil separator and air filter.

Another object of the invention is to provide a novel mechanism which combines the functions of controlling and filtering the air pressure supply for inflatable ice eliminating units.

Another object of the invention is to provide a novel mechanism whereby the air pressure to inflatable ice eliminating units may be automatically regulated according to the momentary demands of the system; the mechanism providing novel means for discharging overboard all pressure air in excess of the momentary requirement.

Another object of the invention is to provide a mechanism embodying a novel improved valve structure over that of the disclosure of my copending application Serial No. 585,941 filed March 31, 1945, particularly in the simplification of the two main control valves and pressure release valve shown in the latter application; which have been simplified in the present application into a single control and regulating valve which effects the functions performed by the three aforenoted valves and in addition performs a further function of regulating the air pressure to the inflatable ice eliminating boots according to the momentary demands of the system and discharges overboard all pressure air in excess of the momentary demand, which is based upon a predetermined differential between the boot line pressure and atmospheric pressure as measured by a novel control diaphragm servo valve means.

Another object of the invention is to so arrange the novel servo valve and main valve as to effect stability of control.

Another object of the invention is to provide a novel mechanism whereby only that portion of the air pressure supply, which is actually required by the inflatable units is filtered, thereby allowing the utmost economy and efficiency in regard to filter element usage.

Another object of the invention is to provide a combination centrifugal oil separator and air filter of great efficiency in comparison to its size and of such simplicity in construction as to adapt it for manufacture and installation at low cost.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 1 is a fragmentary plan view of an aircraft, showing diagrammatically the manner in which the novel mechanism is connected into the inflatable ice eliminating system.

Figure 2 is a schematic diagram of the mechanism illustrating the regulating valve in an inoperative relation.

Figure 3 is a schematic diagram of the mechanism of Figure 2 illustrating the regulating valve in an operative relation.

Figure 4 is an enlarged fragmentary sectional view illustrating the operating parts of the regulating valve mechanism.

Referring to the drawing of Figure 1, there is shown an aircraft indicated by the numeral 1 having an engine 2 and inflatable boots 3 mounted along the leading edge of the plane as shown, for example, in the copending application Serial No. 498,248, filed August 11, 1943, by Donald M. Lawrence, David Gregg and Myron L. Taylor, now Patent No. 2,515,519.

The engine 2 is arranged so as to drive an aircraft propeller 5. An air pump 6 is also driven by the engine 2 and has provided a suction conduit 7 leading to the main suction line 8 through suitable relief and check valves, as shown.

An air pressure line 9, leads from the pump 1 to the inlet of an oil separator and air filter indicated generally by the numeral 10. The air passes through the device 10 and during operation of the ice eliminating system into the outlet conduit 12. During the passage of the air through the device 10, any particles of oil which may enter the air from the pump 10 or other source, is separated and the air is filtered from dirt and other extraneous matter. The air flow thus processed, is conducted through the conduit 12 to the main air pump line 15.

The main suction and air pressure lines 9 and 15 lead to suitable air distributor valves 18 which are electrically controlled by a timer indicated generally by the numeral 20 so as to operate the inflatable boot elements 3. A plurality of such distributor valves are preferably provided of a type such as shown in the aforenoted copending application. The timer 20 may be of the type shown in the latter copending application or may be of a type such as shown in the copending application Serial No. 498,250, filed August 11, 1943, by Myron L. Taylor, William B. Pond and Herbert A. Eayrs, now Patent No. 2,444,208. The operation of the timer is described in detail in the aforenoted copending applications.

A manually operable switch 25 is arranged to control the operation of the timer, as will be readily apparent, through electrical conductors 26 and 27 leading from a source of electrical energy 28 while operation of the oil separator and air filter 10 is controlled simultaneously through electrical conductors 29 and 30.

Thus by closing the switch 25 the timer 20 and the device 10 are simultaneously placed in operation by the closing of the circuits 26—27 and 29—30 which control the same. However, when switch 25 is open, the device 10 is arranged so as to direct the air flow from the conduit 12 to an overboard dump 31 as will be explained hereinafter.

The device 10, or regulating-unloading valve and oil separator, comprises a control head 40, shown schematically in Figures 2 and 3, and containing a pressure regulating and unloading valve 41 and a solenoid operated servo valve mechanism 42.

The control head 40 has formed as a part thereof a plate 43 which forms the cover for a casing 44 of an oil separator. The casing 44 has an upper annular end 45 suitably engaged in an annular grooved flange 46 formed in the end plate 43 as shown in Figure 4.

An opposite bottom portion of the casing 44 is formed by the inwardly and downwardly extending sides 47 as shown in Figures 2 and 3. The cover plate 43 is secured in position by a tubular member 48. One end of the tubular member 48 is screw threaded at 49 into a boss 50 on the bottom of the cover plate 43. The opposite end of the tubular member 48 is screw threaded at 51 into the bottom portion 47 of the casing 44.

The tubular member 48 has a passage 52 and ports 53 opening into the passage 52 for permitting the drainage of oil from the interior of the casing 44. A suitable conduit 54 is connected to the end of the tubular member 48 for the drainage of oil therefrom.

Extending from the top plate 43 is a second casing 60 having its upper annular end 61 suitably engaged in an annular grooved flange 62 formed in the end plate 43. The casing 60 is positioned within and in spaced relation to the casing 44 and has suitably apertured upper and lower end plates 63 and 64, respectively.

There is disposed within the casing 60 a filter pack 65 formed of a suitable material such as cellulose cotton material arranged to absorb oil vapor. There may also be positioned in the casing 60 at the upper end of the cellulose cotton material, a suitable layer of activated carbon or some other type of vapor absorbing material. There is thus provided in the casing 60 a filter pack 65 which may be held in position by the top plate 63. The top plate 63 is fastened in position by suitable means.

As shown in Figures 2 and 3, the inner casing 60 and bottom plate 64 are positioned in spaced relation to the inner surface of the outer casing 44 so as to define a passage between the inner and outer casings indicated by the numeral 66. The tubular member 48, moreover, is positioned in concentric relation to the inner and outer casings 44 and 60. Between the perforated top plate 63 and cover plate 43 is provided a cored chamber 67 which, as shown schematically in Figures 2 and 3, opens through a port 68 in the plate 43 into a cored outlet passage 69 formed in the control head 40. There is screw threadedly engaged in the outlet passage 69 one end of the pressure conduit 12, shown in Figure 1.

As shown schematically in Figures 2 and 3, the control head 40 has four ports, the air pressure outlet port 69, an air pressure inlet port 70, an air discharge port 71 and a suction port 72.

A mounting bracket 75, which is bolted to the control head 40 as shown in Figures 1 and 4, has an arm 76 which extends down alongside the casing 44 of the oil separator and provides means for conveniently mounting the device 10.

As shown schematically in Figures 2 and 3, the control head 40 has an air inlet passage 70 in which there is engaged one end of the pressure conduit 9 leading from the air pump 6. The passage 70 opens into a chamber 80. The discharge passage 71 opens from the chamber 80 into the discharge conduit 31 while an oppositely disposed passage 81 opens from chamber 80 into a chamber 82 formed in the control head 40. The chamber 80 is separated from the chamber 82, as best shown in Figure 4, by a plate 84 suitably fastened in position.

As shown in Figure 3, the chamber 81 opens through a cored passage 86 into an opening 87 formed in the top plate 43 and leading into the passage 66 formed between the inner and outer casings 44 and 60.

Positioned in the passage 66 is an annular ring 90 having formed therein a series of radial vanes, one of which is indicated in Figure 4 by numeral 91. The vanes 91 project inwardly through slots formed in the ring 90 and are so arranged as to give to the incoming air flow a centrifugal spin for a purpose which will be described hereinafter.

Controlling the opening of the passages 71 and 81 into chamber 80 is the novel pressure regulating and control valve 41. As best shown in Figure 4, the valve 41 comprises a frusto-conical portion 95 and a resilient flap portion 96 affixed to one end of a valve stem 97 by a nut 98. The frusto-conical portion 95 extends into the passage 71 and regulates the air discharge as will be explained hereinafter, while flap portion 96 cooperates with the open end of the passage 81 so as to control the passage of air pressure from the chamber 80 to the chamber 82.

The stem 97 is slidably mounted in the passage 81 by a bracket 99 affixed to the plate 84 by rivets 100. The stem 97 extends through the passage 81 into the chamber 82.

The inner end of the stem 97 is fastened by a nut 101 to a flexible diaphragm member 102 which extends across the chamber 82 and is suitably mounted therein. As shown in Figures 2 and 3 the diaphragm 102 thus provides in the control head 40 another chamber indicated by the numeral 103.

Positioned in the chamber 103 is a coil spring 104 which biases the diaphragm 102 as viewed in Figures 2, 3 and 4 in a direction toward the left so as to cause the regulating valve portion 95 to move in a direction to close the opening 71 and the flap valve portion 96 in a like direction so as to open the passage 81 to the air pressure in chamber 80.

As shown in Figures 2 and 3, a bleed passage 105 leads from the chamber 103 to a passage 106 formed in the servo valve mechanism 42. During inoperation of the servo valve mechanism 42, the passage 105 is connected through passage 106, as shown in Figure 2, to the suction port 72 connected to a suction conduit 108 and thereby to suction line 8. The sub-atmospheric pressure in the suction line 8 is thus applied to the diaphragm 102 at the chamber 103 through the bleed 105 so as to augment the air pressure applied to the valve portion 95 at the chamber 80 and counteract the force exerted by the spring 104 and normally hold the flap valve portion 96 so as to close the passage 81 to the chamber 80.

The servo valve mechanism 42, as shown in Figures 2 and 3, includes a solenoid or electromagnet 110 which is electrically connected through connector plug 111 indicated in Figures 1 and 4, with the circuit 29 and 30 previously described with reference to Figure 1.

The solenoid 110 controls the movement of an armature 112 fastened to one end of a valve stem 113 slidably mounted in the valve passage 106. A spring 114 is mounted in the passage 106 at the opposite end of the valve stem 113. The stem 113 is biased under force of the spring 114 in a direction opposing the action of the solenoid 110.

The valve stem 113 has valve members 115 and 116. As shown in Figures 2 and 3 the valve portion 115 opens the suction port 72 to valve passage 106 upon deenergization of the solenoid 110 and closes port 72 to valve passage 106 upon energization of the solenoid 110.

Upon deenergization of the solenoid 110, the valve portion 116 closes the opening of a port 117 to the valve passage 106 and opens the port 117 to the valve passage 106 upon energization of the solenoid 110. The port 117 leads through a restricted passage 118 to a chamber 119 which is in turn connected through a cored passage 120 formed in the control head to the air outlet pressure passage 69, as shown schematically in Figures 2 and 3.

It will be seen then that during deenergization of the solenoid 110 the chamber 103 is connected through passage 105, 106 and 72 to a source of suction. However, upon energization of the solenoid 110 the chamber 103 is connected to a source of air pressure through passage 105, 106 and 117 so as to augment the biasing force applied by spring 104 to the diaphragm and cause the flap valve portion 96 to open passage 81 to chamber 80 and cause valve portion 95 to tend to close the discharge conduit 71 to the chamber 80 as indicated in Figures 3 and 4. Due to the mechanism herein provided, however, the valve portion 95 is regulated so as to maintain the outlet pressure in the passage 69 at a predetermined differential in excess of the prevailing atmospheric pressure.

The latter regulating action is effected by a second regulator valve mechanism comprising a valve stem 121 slidably mounted in a chamber 122 and affixed at one end to a diaphragm 123 which separates chamber 119 from another chamber 124 open to atmospheric pressure through a port 125. A spring 126 biases the diaphragm 122 toward the chamber 119 and may be exteriorly adjusted through an adjustment bolt 127.

At the opposite end of the valve stem 121 there is provided a needle valve 128 which controls a valve port 129 opening between chamber 122 and a chamber 130.

A passage 131 connects chamber 130 to the suction port 72, while a passage 132 connects chamber 122 to the passage 117. Thus the needle valve 128 is regulated by the diaphragm 123 so as to cause the pressure applied to diaphragm 102 to effect the regulator valve 41 so as to maintain the air pressure at the outlet passage 69 at a predetermined differential in excess of the atmospheric pressure acting on the diaphragm 123.

It will be seen from the foregoing arrangement that during the regulating operation of the valve 41, the portion 95 serves to regulate the air outflow from chamber 80 through discharge conduit 71, while the flap valve portion 96 cooperates therewith in regulating the opening 81 and the air flow from the chamber 80 to the chamber 82.

Moreover, the arrangement of the diaphragm 102 so as to be subject to the pressure in the chamber 82 provides a convenient means for effecting stability of control. Thus sudden changes in the air inlet pressure will be reflected by movement of the diaphragm 102 and valve 41 to correct for such change. Thus the diaphragm 102 in effect anticipates change in the pressure at the air outlet conduit 69 due to the change in the air inlet pressure so as to provide stability of control.

*Operation*

When the solenoid 110 is deenergized, control valve 115 is held in a position whereby suction is applied through the passages 72, 106 and 105 leading into the chamber 103. The suction is sufficient to force the diaphragm 102 to compress the spring 104. In this position the diaphragm 102 holds the valve mechanism 41 so as to close passage 81 to the chamber 80 and allow the air under pressure flowing through the inlet port 70 to pass directly out through the overboard exhaust conduit 31 as shown in Figure 2.

When the solenoid 110 is energized, the control valve of members 115 and 116 move to the position shown in Figure 3 whereby the direct suction passage 72 is closed off and passage 117 is opened allowing the diaphragm under air pressure to expand, forcing the diaphragm 102 to move the valve mechanism 41 into the operating position of Figure 3.

In this position some of the air under pressure will be admitted through the passage 81 and as shown in Figure 3 will pass through the cored passage 86 to the inlet of the oil separator 87. The latter operation permits the air entering the passage 70 under pressure of the pump 6 to flow through the chamber 80, passage 81, chamber 82 and the cored passage 86 into passage 66 of the oil separator. In the latter passage 66, the radial vanes 91 give the air a centrifugal spin tending to separate the particles of oil from the air. The thus separated oil particles tend to drip down the inner side of the casing 44 and collect in the recessed bottom 47. The oil thus collected is discharged through the port 53 and passage 52 of the tubular member 48.

The air flow, moreover, passes downward and up through the perforated bottom 64 of the casing 60 and into the filter pack 65 where the oil vapors are absorbed. The air then continues to flow upward and through the perforated top plate 63 into chamber 67.

From chamber 67 the air passes through passages 68 and 69 into the outlet conduit 12. The air flows through outlet conduit 12 to the main pressure conduit 15 and through distributor valves 18 to the inflatable ice eliminator groups 3.

Simultaneously the control components of the unit 10 will begin to regulate the air outlet pressure according to the setting of the adjustment screw 127 which determines the regulating point of control diaphragm 126. The internal connection 120 indicated by the dash line in Figure 3 references the air pressure at the outlet 69 to that in the pressure differential chamber 119.

Thus, the control diaphragm 123 will be sensitive to deviations from the desired pressure at the outlet 69. If this outlet air pressure is excessive, the control diaphragm 123 will be forced upward overcoming the force of its spring 126 and the atmospheric pressure applied through port 125.

In this position the control diaphragm 123 operates the needle valve 128 so as to open the passage 129 and thereby the passage 17 to suction applied through passage 132, chamber 122, passage 129, chamber 130, passage 131 and passage 72. The suction is in turn applied from passage 117 through restricted port 118 to chamber 119.

Some of the suction will also be applied back through the passage 117 and 105 leading into the chamber 103 and will aid in actuating the diaphragm 102 to partly open the discharge port 71 thereby reducing the amount of air pressure to the oil separator.

If the outlet air pressure at the passage 69 is insufficient the control daphragm 123 will progressively close the needle valve opening 129 allowing the diaphragm 102 to expand until the valve portion 95 entirely closes the passage to the overboard exhaust 71 and all the available air pressure suply will be applied through the oil separator to the outlet passage 69.

It is to be noted that only the air pressure flow which passes to the inflatable ice eliminator boots is filtered, and thus effecting an economical usage of the filter material. Also, before reaching the filter material 65, the air pressure flow passes down the relatively cooler sides of the casing 44, so that much of the oil vapors will be condensed on the side of the casing 44. An outlet plug 54 is provided to permit drainage of this condensed oil.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A device of the character described comprising, in combination, a casing having air inlet and air outlet means for air under superatmospheric pressure, means carried by said casing for separating oil from oil ladened air, means operatively connecting said separating means between the inlet and outlet means, an air discharge means leading from said air inlet means, a valve member carried by said casing to control said air discharge and air outlet means and alternately operable to open and close the connecting means between said air inlet means and said separating means, and regulating means responsive to the superatmospheric pressure to operate said valve member so as to maintain a predetermined air pressure condition at said air outlet means upon said valve member opening said connecting means between said air inlet means and said separating means.

2. A device of the character described comprising, in combination, a casing having air inlet and air outlet means for air under superatmospheric pressure, means carried by said casing for separating oil from oil ladened air, means operatively connecting said separating means between said inlet and outlet means, an air discharge means opening from said air inlet means, a valve controlling said air discharge means, motor means for operating the valve, and regulating means responsive to the superatmospheric pressure at the air outlet means for regulating the operating motor means for said valve and thereby the opening of said air discharge means from said air inlet means to maintain a predetermined air pressure condition at said air outlet means.

3. For use in an ice eliminating system for aircraft having a plurality of inflatable boots formed of a rubber-like material and mounted on airfoil surfaces of said aircraft, and a pump for providing a source of superatmospheric air pressure for inflating said boots; the combination comprising means for removing oil from oil ladened air, and said oil removing means including an air inlet conduit and an air outlet conduit adapted to connect said oil removing means between said pump and said boots, an air discharge conduit leading to atmosphere from said inlet conduit, a valve member for regulating said discharge conduit and thereby the air inlet pressure to said oil removing means, a third conduit connecting the inlet conduit to said oil removing means, operating means for said valve member, operator-operative control means for said operating means to affect said valve member so as to alternately open and close the third conduit, and control means responsive to the superatmospheric pressure and effective upon the opening of the third conduit to control said operating means so as to regulate said valve member and thereby said discharge conduit to maintain a predetermined boot inflating pressure condition in said outlet conduit.

4. For use in an ice eliminating system for aircraft having a plurality of inflatable boots formed of a rubber-like material and mounted on airfoil surfaces of said aircraft, and a pump for providing a source of superatmospheric air pressure for inflating said boots; the combination comprising means for removing oil from oil ladened air, and said oil removing means including an air inlet conduit and an air outlet conduit adapted to connect said oil removing means between said pump and said boots, an air discharge conduit leading to atmosphere from said inlet conduit, a valve member for regulating said discharge conduit and thereby the air inlet pressure to said oil removing means, a third conduit connecting the inlet conduit to said oil removing means, operating means for said valve member, electromagnetic control means for said operating means to affect said valve member so as to alternately open and close the third conduit, an electrical control circuit means for effecting operation of the ice eliminating system and said electromagnetic means, and control means responsive to superatmospheric pressure in said outlet conduit and effective upon operation of said electromagnetic means in one sense to control said operating means so as to regulate said valve member and thereby said discharge conduit to maintain a predetermined boot inflating pressure condition in said outlet conduit during the operation of the ice eliminating system.

5. For use in an ice eliminating system for aircraft having a plurality of inflatable boots formed of a rubber-like material and mounted on airfoil surfaces of said aircraft, and a pump for providing a source of superatmospheric air pressure for inflating said boots; the combination comprising means for removing oil from oil ladened air and said oil removing means including an air inlet conduit and an air outlet conduit adapted to connect said oil removing means between said pump and said boots, an air discharge conduit leading to atmosphere from the air inlet conduit, and an air release valve for regulating said air discharge conduit and thereby the superatmospheric air pressure applied through said oil removing means to said air outlet conduit, and differential pressure responsive means sensitive to the atmospheric pressure and the superatmospheric pressure for operating said valve so as to maintain the air pressure applied to said boots through said outlet conduit at a pressure in excess of prevailing atmospheric pressure by a predetermined value.

6. For use in an ice eliminating system for aircraft having a plurality of inflatable boots and a source of superatmospheric fluid pressure for inflating said boots; the combination comprising a casing having a fluid discharge opening to atmosphere and including a fluid inlet conduit and a fluid outlet conduit for fluid under superatmospheric pressure, a movable valve member alternately operable to close said fluid outlet conduit to said fluid inlet conduit or open said fluid outlet conduit to said fluid inlet conduit and regulate said fluid discharge conduit, means for removing oil from the fluid in said outlet conduit, and differential pressure responsive means sensitive to atmospheric pressure and the fluid pressure in said outlet conduit for operating said valve member so as to regulate said fluid discharge opening to maintain the fluid pressure in said outlet conduit at a pressure in excess of prevailing atmospheric pressure by a predetermined value, and said differential pressure responsive means being effective only upon said valve member opening said outlet conduit to said inlet conduit.

7. A control device comprising, in combination, an inlet conduit for air under superatmospheric pressure, an air discharge conduit opening from said air inlet conduit to atmosphere, an outlet conduit for said air pressure opening from said inlet conduit, a main valve member for alternately opening and closing the opening of said outlet conduit from said inlet conduit, said main valve member also effective for regulating the opening of said discharge conduit from said air inlet conduit upon the opening of said outlet conduit, motor means for positioning said main valve member so as to maintain a predetermined pressure condition at said air outlet conduit; said motor means including a pressure sensitive member affected at one side by the pressure of the air in said outlet conduit, operator-operative servo valve means for applying selectively superatmospheric and sub-atmospheric pressures to the opposite side of said pressure sensitive member for controlling the position of said main valve member relative to the opening of said outlet conduit from said inlet conduit, a regulating valve for controlling the application of said superatmospheric and sub-atmospheric pressures to the opposite side of said pressure sensitive member upon the opening of said outlet conduit from said inlet conduit by said main valve member, and differential pressure responsive means for controlling said regulating valve so as to maintain a predetermined differential between the superatmospheric pressure at said air outlet conduit and the prevailing atmospheric pressure.

8. A device for removing oil from oil ladened air, comprising, in combination, an outer casing, an inner casing mounted within said outer casing and positioned in spaced relation thereto so as to define a downwardly extending air passage between said casings, an inlet conduit for air under superatmospheric pressure, said air inlet conduit having a first valve opening connecting said air inlet conduit to said first mentioned air passage, an air outlet conduit provided at the upper end of said inner casing, means carried by at least one of said casings for removing oil vapors from said oil ladened air in passing from said air inlet conduit through said casings to said air outlet conduit, said air inlet conduit having a second valve opening to atmosphere in alignment with said first valve opening, a single valve member positioned between said first and second valve openings in said air inlet conduit, said valve member effective for alternately opening and closing the first valve opening connecting said air inlet conduit to said first mentioned air passage, a diaphragm for controlling the position of said valve member, said diaphragm also effective for positioning said valve member so as to regulate the second valve opening to atmosphere to maintain the air pressure in the outlet conduit at a predetermined value, and differential pressure responsive means to regulate said diaphragm upon said first valve opening connecting said air inlet conduit to said first mentioned passage being opened by said valve member, said last mentioned means being differentially affected by prevailing atmospheric pressure and the superatmospheric pressure at said air outlet conduit.

9. A device for removing oil from oil ladened air, comprising, in combination, an outer casing, an inner casing mounted within said outer casing and positioned in spaced relation thereto so as to define a downwardly extending air passage between said casings, an inlet conduit for air under superatmospheric pressure, means connecting said air inlet conduit to said first mentioned air passage, air filter means carried by said inner casing for removing oil vapors from said oil ladened air in passing through said inner casing to said air outlet conduit, an air discharge conduit opening from said air inlet conduit, a single valve member for alternately opening and closing the connecting means from said air inlet conduit to said air passage, said valve member effective for regulating said air discharge conduit upon the opening of said connecting means, a diaphragm operably connected to said valve member, said diaphragm affected at one side by the pressure of the air in said last mentioned connecting means, a valve mechanism for applying selectively superatmospheric and sub-atmospheric pressures to the opposite side of said diaphragm, another valve for regulating the superatmospheric pressure applied to said diaphragm, and a second diaphragm for positioning said other valve in accordance with a predetermined differential between the superatmospheric pressure at said air outlet conduit and the prevailing atmospheric pressure.

10. A device of the character described comprising, in combination, a casing having air inlet and air outlet means, means carried by said casing for separating oil from oil ladened air and connected between said air inlet and air outlet means, an air discharge conduit connected to said air inlet means, an air pressure operated main valve, pressure responsive means for regulating said main valve and thereby the connection of said air inlet means to said discharge conduit in responsive to the air pressure being applied at said air outlet means, and operator-operative valve means carried by said casing and alternately operable for affecting said main valve so as to open and close the connection of said air inlet means to said separating means and to place said pressure responsive means in and out of operative relation.

11. In an ice eliminating system for aircraft of the class including a plurality of inflatable boots formed of a rubber-like material and mounted on airfoil surfaces of said aircraft, a pump for providing a source of superatmospheric air pressure, air distributor valves for controlling the inflation and deflation of said boots, air conduit means for conducting the superatmospheric air pressure from said pump to said distributor valves for inflating said boots, electrical circuit means including a manually operable switch means for controlling the operation of said air distributor valves, and means for removing oil from the oil ladened air from said pump; the improvement comprising an air discharge conduit leading to atmosphere, means for connecting said discharge conduit to the air inlet side of said oil removing means, valve means for regulating said connecting means to said discharge conduit and thereby the air inlet pressure to said oil removing means during operation of said system, and electromagnetic means for controlling the operation of said valve means, said electromagnetic means connected in said electrical circuit means and controlled through operation of said switch means in such a manner as to cause said valve means to close the connection of said pump to said oil separator means during inoperation of said system and open said connection at such times as said system is in an operating condition, and differential pressure responsive means for operating said valve means when said system is in said operating condition so as to maintain the superatmospheric air pressure applied to said boots at a pressure in excess of prevailing atmospheric pressure by a predetermined value.

12. An ice eliminating system for aircraft of the class including a plurality of inflatable boots formed of a rubber-like material and mounted on airfoil surfaces of said aircraft, a pump for providing a source of super-atmospheric air pressure for inflating said boots, means for removing oil from the air from said pump, said means connected between said pump and said boots, and an air discharge conduit for said pump leading to the atmosphere; characterized by the fact that there is combined with said oil removing means a valve means for alternately connecting the superatmospheric air pressure from said pump to said discharge conduit or to said inflatable boots through said oil removing means, and differential pressure responsive means effective under said last mentioned condition for operating said valve means so as to regulate said discharge conduit to maintain the superatmospheric air pressure to said boots at a pressure in excess of prevailing atmospheric pressure by a predetermined value.

13. A device of the character described comprising, in combination, a casing having inlet and outlet means for air under superatmospheric pressure, means carried by said casing for removing oil from said air and operatively connected between said inlet and outlet means, means for regulating said air inlet means, differential pressure responsive means sensitive to prevailing atmospheric pressure and the superatmospheric pressure, and means operatively connecting said differential pressure responsive means to said regulating means to adjust said regulating means in accordance with the differential between said prevailing pressures so as to maintain the pressure of the air at said outlet means at a pressure in excess of the prevailing atmospheric pressure by a predetermined value.

14. A device of the character described comprising, in combination, a casing having inlet and outlet means for air under superatmospheric pressure, means carried by said casing for separating oil from said air and operatively connected between said inlet and outlet means, valve means carried by said casing for regulating the air inlet means, motor means to position said valve means, control means for said motor means, differential pressure responsive means sensitive to prevailing atmospheric pressure and the superatmospheric pressure, and means operatively connecting said differential pressure responsive means to said control means to cause said motor means to position said valve means so as to maintain the pressure of the air at said outlet means at a pressure in excess of the prevailing atmospheric pressure by a predetermined value.

DONALD M. LAWRENCE.

References Cited in the file of this patent

UNITED STATES PATENTS

| Number | Name | Date |
|---|---|---|
| 246,348 | Sloane | Aug. 30, 1881 |
| 1,231,293 | Peters | June 26, 1917 |
| 1,237,922 | Lucus | Aug. 21, 1917 |
| 1,288,578 | Hatfield | Dec. 24, 1918 |
| 1,889,120 | Donovan | Nov. 29, 1932 |
| 2,379,181 | Pontius | June 26, 1945 |
| 2,405,362 | Lehman et al. | Aug. 6, 1946 |
| 2,476,198 | Lawrence | July 12, 1949 |